(12) United States Patent  (10) Patent No.: US 7,832,709 B2
O'Connor  (45) Date of Patent: Nov. 16, 2010

(54) WIRE PULLING APPARATUS

(75) Inventor: Jim O'Connor, Halfmoon Bay, CA (US)

(73) Assignee: Cupertino Electric Inc., San Jose, CA (US)

( * ) Notice: Subject to any disclaimer, the term of this patent is extended or adjusted under 35 U.S.C. 154(b) by 615 days.

(21) Appl. No.: 11/773,898

(22) Filed: Jul. 5, 2007

(65) Prior Publication Data

US 2008/0224108 A1  Sep. 18, 2008

Related U.S. Application Data

(60) Provisional application No. 60/895,122, filed on Mar. 15, 2007.

(51) Int. Cl.
*E21C 29/16* (2006.01)
(52) U.S. Cl. ................. 254/134.3 R; 254/134.3 FT
(58) Field of Classification Search ........ 254/134.3 FT, 254/134.3 R, 326, 213, 227, 335, 361, 93 H, 254/134.5, 134.3 PA, 134.3 CL, 1; 269/902; 212/285, 293, 302, 181, 299
See application file for complete search history.

(56) References Cited

U.S. PATENT DOCUMENTS

| | | | | | |
|---|---|---|---|---|---|
| 2,655,653 | A | * | 10/1953 | Chauvin | ............. 254/134.3 FT |
| 2,948,510 | A | * | 8/1960 | Kieser | ..................... 254/326 |
| 3,317,149 | A | * | 5/1967 | Gooch | ..................... 242/564.4 |
| 4,139,751 | A | * | 2/1979 | Rostron et al. | ................. 218/65 |
| 4,304,519 | A | * | 12/1981 | Hubbard | ..................... 414/563 |
| 4,456,225 | A | * | 6/1984 | Lucas | ................. 254/134.3 FT |
| 4,899,988 | A | * | 2/1990 | Mills | ......................... 254/292 |
| 5,082,127 | A | * | 1/1992 | Huang | ........................ 212/299 |
| 5,226,776 | A | * | 7/1993 | Vestergaard | ................. 414/680 |
| 6,073,916 | A | * | 6/2000 | Plummer | .............. 254/134.3 R |
| 2003/0098450 | A1 | * | 5/2003 | Cook et al. | ........... 254/134.3 R |
| 2007/0131636 | A1 | * | 6/2007 | Spitsbergen | ................ 212/179 |

* cited by examiner

*Primary Examiner*—Lee D Wilson
*Assistant Examiner*—Jamal Daniel
(74) *Attorney, Agent, or Firm*—Martine Penilla & Gencarella, LLP

(57) ABSTRACT

A frame is pivotally connected to a chassis at a location near a first end of the frame. A jack is disposed between the chassis and the frame to enable pivoting movement of the frame relative to the chassis. A pulley is connected to the frame at a location near a second end of the frame that is opposite the first end of the frame. A winch is disposed on the frame to enable pulling of wire over the pulley. A control device enables control of the jack so as to enable positioning of the pulley that is connected to the frame.

16 Claims, 10 Drawing Sheets

WIRE PULLING APPARATUS

CLAIM OF PRIORITY

This application claims priority under 35 U.S.C. 119(e) to U.S. Provisional Patent Application No. 60/895,122, filed Mar. 15, 2007. This provisional application is incorporated herein by reference.

BACKGROUND

During construction of facilities, e.g., commercial buildings, residential dwellings, and manufacturing facilities, among others, it is often necessary to pull electrical wire through a length of conduit. In some instances the length of conduit and amount of electrical wire to be pulled can be substantial, thus requiring a large pulling force to be applied to pull the wire through the conduit. To this end a device is needed for applying appropriate force in an appropriate manner to enable pulling of electrical wire through conduit, particularly where the quantity of electrical wire to be pulled is substantial.

SUMMARY OF THE INVENTION

In one embodiment, a wire pulling apparatus is disclosed. The wire pulling apparatus includes a chassis defined to have a front end and a rear end. The wire pulling apparatus also includes a frame defined to have a first end and a second end. The frame is pivotally connected to the chassis at a location near the front end of the chassis and near the first end of the frame. A jack is disposed between the chassis and the frame to enable pivoting vertical movement of the frame relative to the chassis. Additionally, a pulley is supported by the frame at a location near the second end of the frame, whereby the pulley is disposed over the chassis and toward the rear end of the chassis.

In another embodiment, a system is disclosed for pulling wire. The system includes a wire pulling apparatus having a frame pivotally connected to a chassis at a location near a first end of the frame. The wire pulling apparatus also includes a jack disposed between the chassis and the frame to enable pivoting movement of the frame relative to the chassis. A pulley is connected to the frame at a location near a second end of the frame opposite the first end of the frame. The system also includes a winch disposed on the frame of the wire pulling apparatus to enable pulling of wire over the pulley. The system further includes a control device defined to enable control of the jack so as to enable positioning of the frame and pulley connected thereto.

In another embodiment, a method is disclosed for operating a wire pulling apparatus. The method includes an operation for positioning a wire pulling apparatus near a conduit through which a wire is to be pulled. The wire pulling apparatus includes a frame pivotally connected to a chassis at a location near a first end of the frame. The wire pulling apparatus also includes a jack disposed between the chassis and the frame to enable pivoting movement of the frame relative to the chassis. The wire pulling apparatus also includes a pulley connected to the frame at a location near a second end of the frame opposite the first end of the frame. The method also includes operating the jack to move the frame so as to position the pulley at an appropriate height.

Other aspects and advantages of the invention will become more apparent from the following detailed description, taken in conjunction with the accompanying drawings, illustrating by way of example the present invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 1A:
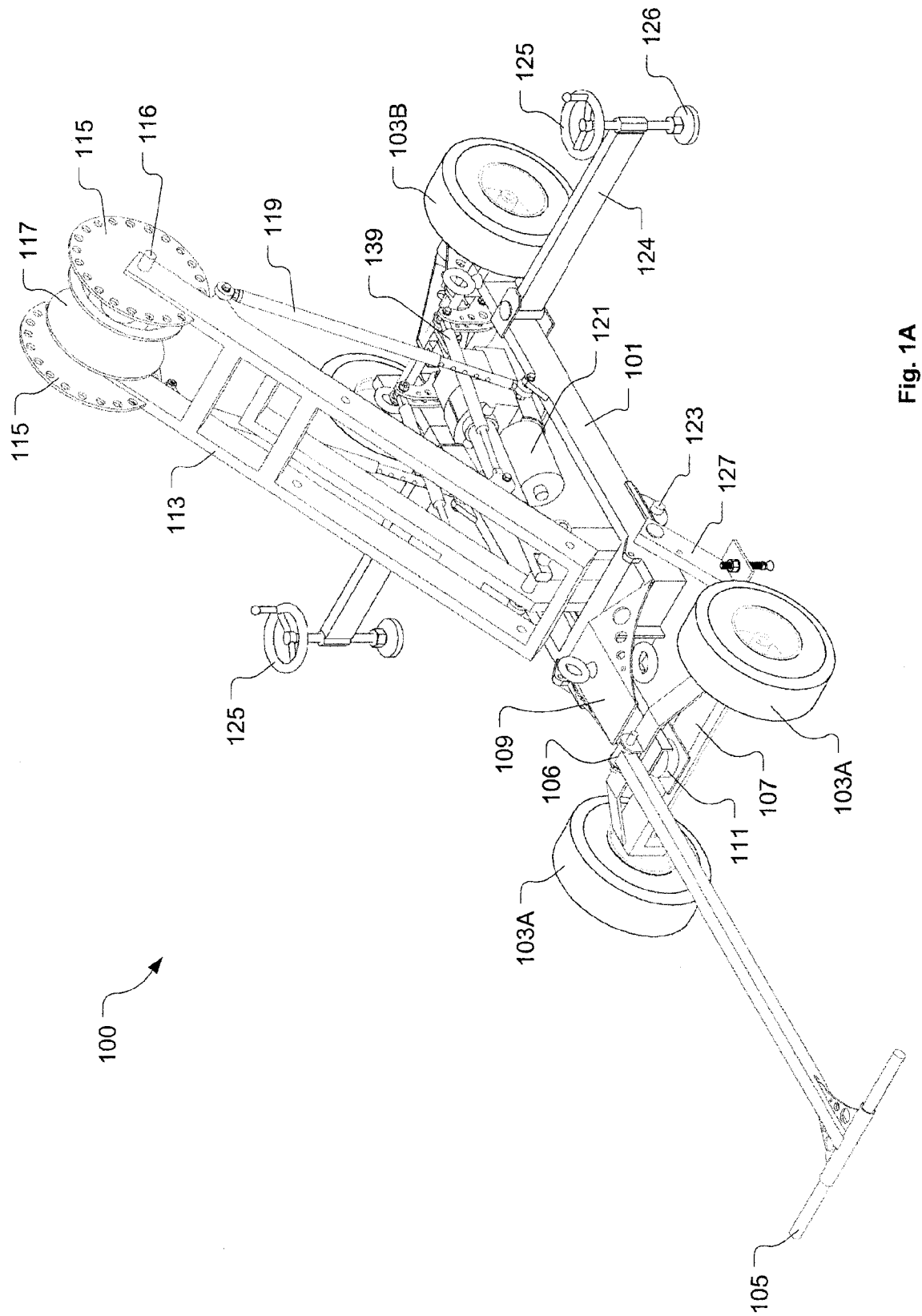
FIG. 1A is an illustration showing a wire pulling apparatus, in accordance with one embodiment of the present invention.

FIG. 1A is an illustration showing a wire pulling apparatus 100, in accordance with one embodiment of the present invention. The apparatus 100 includes a chassis 101 defined to provide support for the upper structures of the apparatus 100. The chassis 101 includes a tongue portion 109 defined at a front end of the chassis 101. The tongue portion 109 is defined to receive a front axle 107 in a pinned connection 111 such that the front axle 107 is capable of pivoting about the pinned connection 111. Front wheels 103A are connected to each side of the front axle 107 by freely rotating pinned connections. In one embodiment, a handle 105 is attached to the front axle 107 at a location above the pinned connection 111. The handle 105 is attached to the front axle 107 by a way of a pinned connection 106 that enables vertical movement of the handle 105. Additionally, the handle 105 is attached to the front axle 107 such that a horizontal movement of the handle 105 causes a horizontal rotation of the front axle 107 relative to the chassis 101. Furthermore, the handle 105 is of sufficient length to provide adequate leverage to enable manual movement of the apparatus 100 through rotation of the front and rear wheels 103A/103B.

The chassis 101 further includes a collar near a rear end of the chassis through which a rear axle is disposed. Rear wheels 103B are connected to the rear axle such that the rear wheels 103B rotate together with the rear axle. The apparatus further includes a frame structure 113 pivotally connected to the chassis 101 at a location near a first end of the frame 113. The frame structure 113 is defined to support each of a wire pulling winch 152 (see FIG. 1B), a pivoting arm connection collar 115, and a freely rotating pulley 117. The pulley 117 is supported by the frame 113 at a location near a second end of the frame 113, opposite the first end of the frame 113 near which the frame 113 is pivotally connected to the chassis 101, whereby the pulley 117 is disposed over the chassis 101 and toward the rear end of the chassis 101. The frame 113 serves as a block for the freely rotating pulley 117. In one embodiment, the pulley 117 is defined as a wheel having a contoured rim for carrying a cable, e.g., rope or line, and having a center collar through which a rotation axle 116 is provided.

Figure 2A:
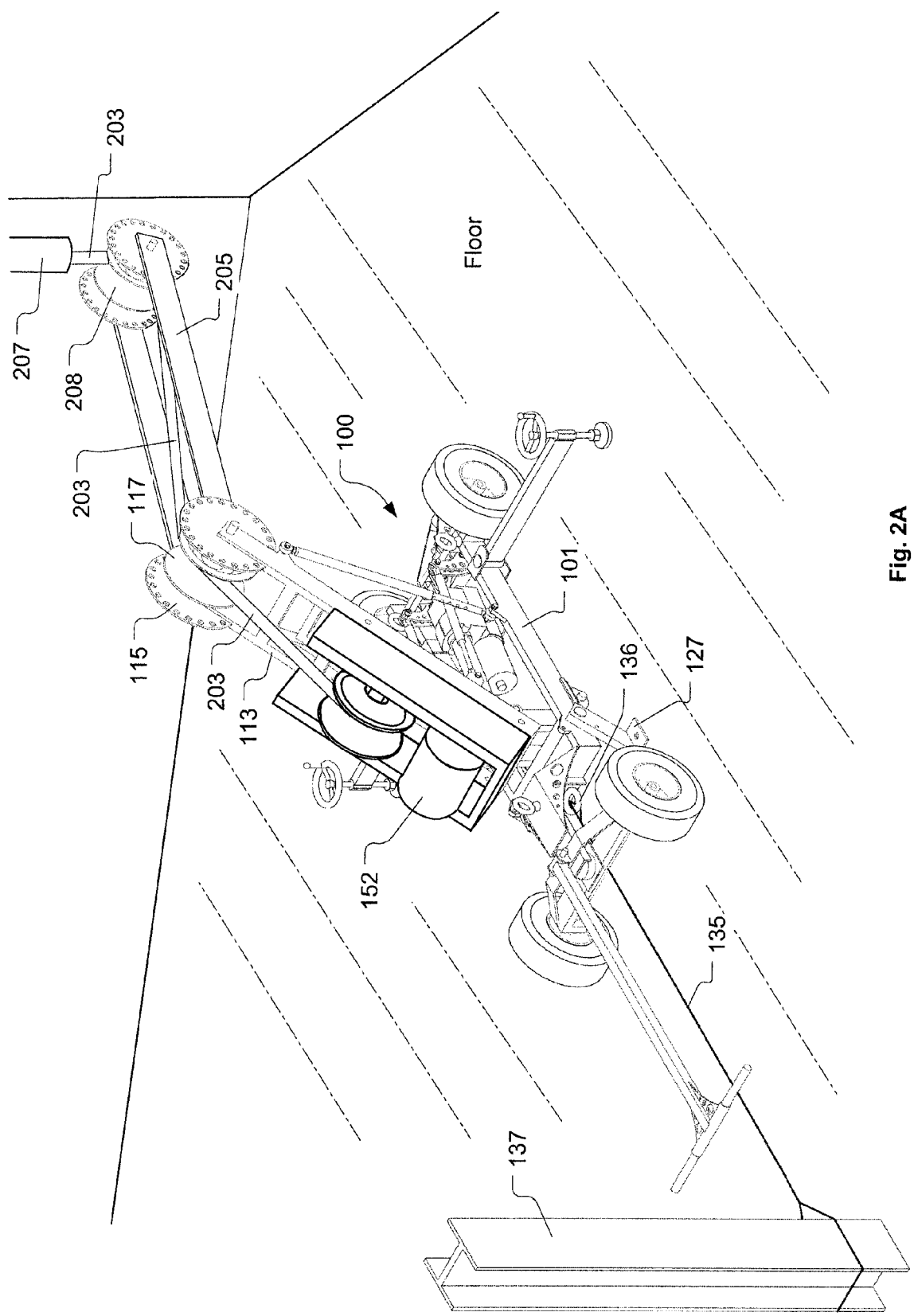
FIG. 2A is an illustration showing the wire pulling apparatus in a deployed configuration, in accordance with one embodiment of the present invention.
Figure 2B:
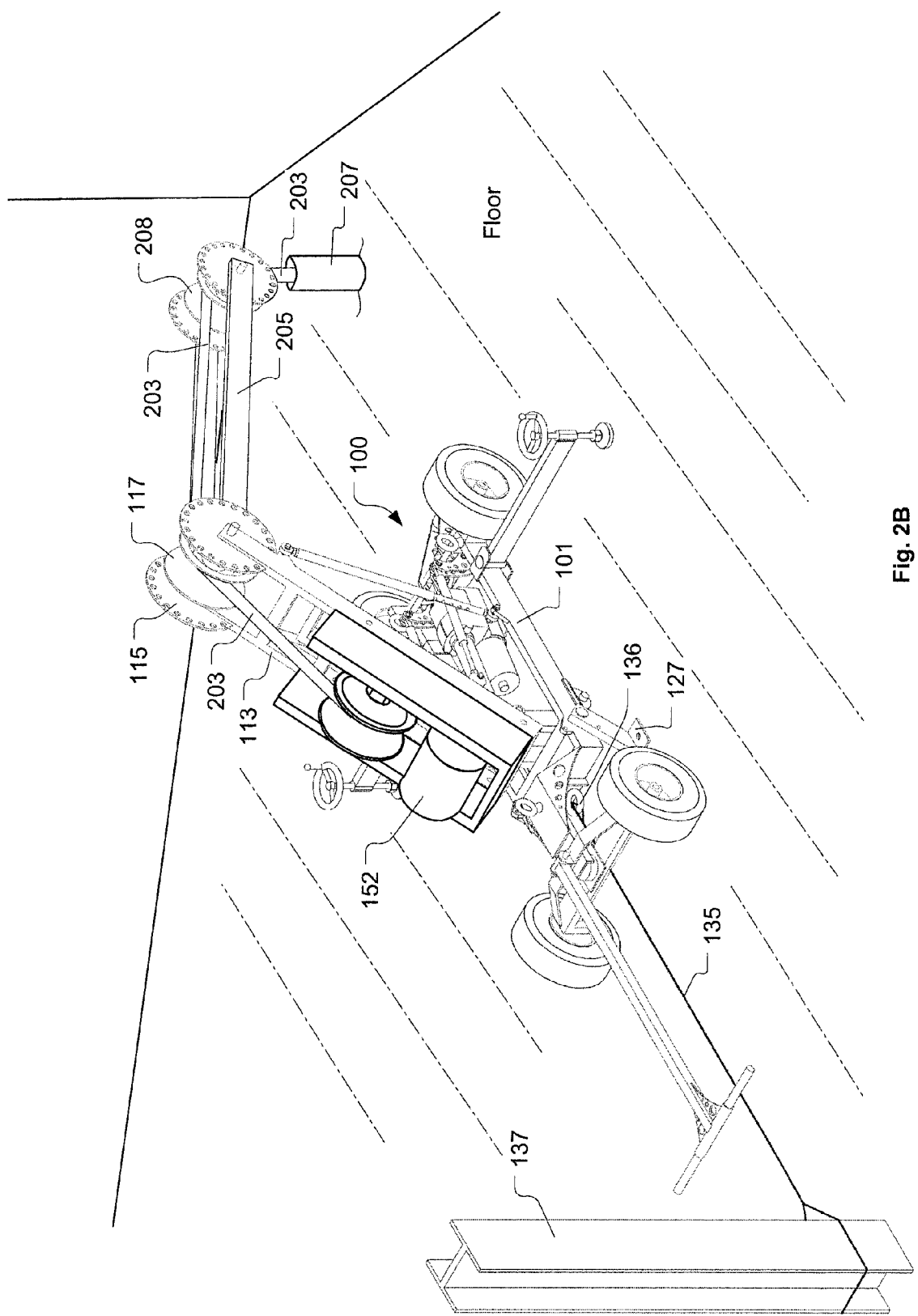
FIG. 2B is an illustration showing the wire pulling apparatus in a deployed configuration, in accordance with one embodiment of the present invention.

The pivoting arm connection collar 115 includes a number of holes defined about its periphery through which an additional pivoting arm can be connected by way of a support pin (see pivoting arm 205 as shown in FIGS. 2A and 2B). Upon connection of an additional pivoting arm, the axle 116 that supports the freely rotating pulley 117 can also serve as an end restraint for the additional pivoting arm. During operation, a cable travels over the freely rotating pulley 117 to a hub of the wire pulling winch 152 (see FIGS. 2A and 2B) that is secured to the upper surface of the frame 113. The wire pulling winch will pull the cable over the pulley 117, thereby pulling electrical wire attached to the cable.

In one embodiment, a stabilizer bar 119 is pivotally connected between the frame 113 and the chassis 101 on each side of the frame 113. More specifically, a first end of the stabilizer bar 119 is pivotally connected to the chassis 101, and a second end of the stabilizer bar 119 is pivotally connected to the frame 113. In another embodiment, a single stabilizer bar 119 can be pivotally connected between the frame 113 and the chassis 101. Also, in another embodiment, more than two stabilizer bars 119 can be pivotally connected between the frame 113 and the chassis 101. For example, in the embodiment of FIG. 1A, in addition to the pair of stabilizer bars 119, each of a second pair of stabilizer bars 139 is pivotally connected between the frame 113 and the chassis 101 on each side of the frame 113.

Additionally, a jack 121 is disposed between the chassis 101 and the frame 113 to enable pivoting movement of the frame 113 relative to the chassis 101. In one embodiment, the jack 121 is defined as an electric jack that is remotely controllable by an electronic control device. In another embodiment, the jack 121 is defined as hydraulic jack that is remotely controllable. In one embodiment, a lifting member of the jack 121 is pivotally connected to the frame, and a base of the jack 121 is rigidly connected to the chassis 101. In one embodiment, the jack 121 is fixed to a carriage portion of the chassis 101. The jack 121 enables electrically controlled vertical movement of the frame 113, i.e., electrically controlled raising or lowering of the frame 113 relative to the chassis 101, about a fixed pivot point 123. In one embodiment, the fixed pivot point 123 is a pinned connection of the frame 113 to the chassis 101. However, in another embodiment, the fixed pivot point 123 can be defined by one or more hinged connections between the frame 113 and the chassis 101. It should be understood that as the frame 113 is raised or lowered, so is the pivoting arm connection collar 115 and the freely rotating pulley 117.

The apparatus 100 further includes extendable/retractable outriggers 125 that can be deployed to stabilize the apparatus 100. Each outrigger 125 includes a bar portion 124 pivotally connected to the chassis 101, and a height adjustable foot 126 defined to engage an underlying stable surface. Additionally, the apparatus 100 includes a pair of locking feet 127 disposed on each side of the chassis 101. Each locking foot 127 is connected to the chassis 101 to enable immobilization of the chassis 101. In one embodiment, the locking feet 127 can be bolted to a floor structure to secure the apparatus 100 from undesirable and unsafe movement during the wire pulling process.

Figure 1B:
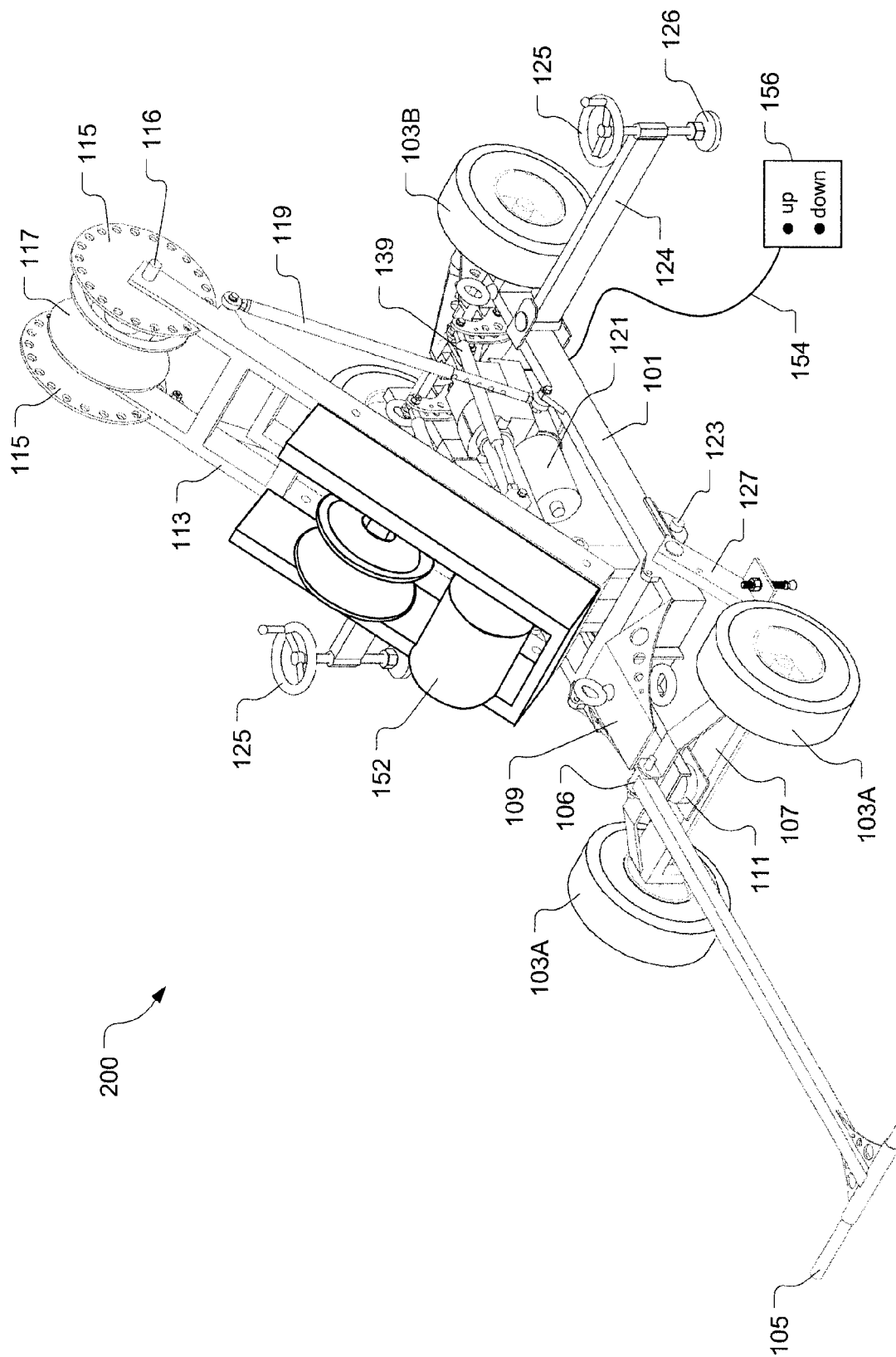
FIG. 1B is an illustration showing a system for pulling wire, in accordance with one embodiment of the present invention.

FIG. 1B is an illustration showing a system 200 for pulling wire, in accordance with one embodiment of the present invention. The system includes the wire pulling apparatus 100, as described above with regard to FIG. 1A. The system 200 also includes the winch 152 disposed on the frame 113 to enable pulling of a cable over the pulley 117. In one embodiment, the winch 152 is defined as an electrically powered winch. However, it should be appreciated that essentially any type of winch 152 can be used in the system 200, so long as the physical specifications of the winch 152 enable securing of the winch 152 to the upper surface the frame 113, and the pulling specifications of the winch 152 comply with the pulling requirements of the wire pulling evolution for which the system 200 is deployed.

The system 200 also includes a control device 156 defined to enable control of the jack 121 so as to enable positioning of the frame 113 and pulley 117 connected thereto. In one embodiment, the control device 156 is an electronic control device remotely coupled the jack 121 by a wire 154. In another embodiment, the control device 156 can provide for wireless control of the jack 121. However, in other embodiments, the control device 156 can be defined in a form other than an electronic control device. For example, in the case of a hydraulic jack 121, the control device 156 may be defined to provide mechanical control of valves used to operate the hydraulic jack 121. It should be appreciated that regardless of the particular embodiment, the control device 156 is defined to enable an operator of the system 200 to adjust a height of the frame 113 and pulley 117 connected thereto without having to manually interact with the frame 113.

FIG. 2A is an illustration showing the wire pulling apparatus 100 in a deployed configuration, in accordance with one embodiment of the present invention. The apparatus 100 is shown as being secured to a nearby structure 137, e.g., an I-beam, by way of a cable 135 connected to an eyebolt 136 that is attached to the chassis 101. The winch 152 is secured to the top of the frame 113. Also, an additional pivoting arm 205 is shown connected to the pivoting arm connection collar 115. A pulley 208 is supported in a freely rotating manner by the pivoting arm 205 at an end of the pivoting arm 205 nearest to a conduit 207 through which a cable 203 is to be pulled. The pivoting arm 205 provides a bridge to the conduit 207, to enable pulling of the cable 203 over the pulley 117 by the winch 152. In this configuration the cable 135 prevents the apparatus 100 from being pulled toward the conduit 207, as the cable 203 is pulled by the winch 152. It should be appreciated that in another embodiment the pair of locking feet 127 can be secured to the floor to immobilize the chassis 101. Deployment of the pair of locking feet 127 can be done in combination with use of the cable 135 or in lieu of use of the cable 135.

FIG. 2B is an illustration showing the wire pulling apparatus 100 in a deployed configuration, in accordance with one embodiment of the present invention. In the deployed configuration of FIG. 2B, the conduit 207 is located at a lower position relative to the pulley 117. In this configuration, the additional pivoting arm 205 is secured so as to provide a bridge to the lower conduit 207, to enable pulling of the cable 203 over the pulley 117 by the winch 152. It should also be understood that in some configurations the additional pivoting arm 205 may not be required, and the cable 203 may be pulled by the winch 152 from the conduit 207 directly over the pulley 117.

Figure 3:
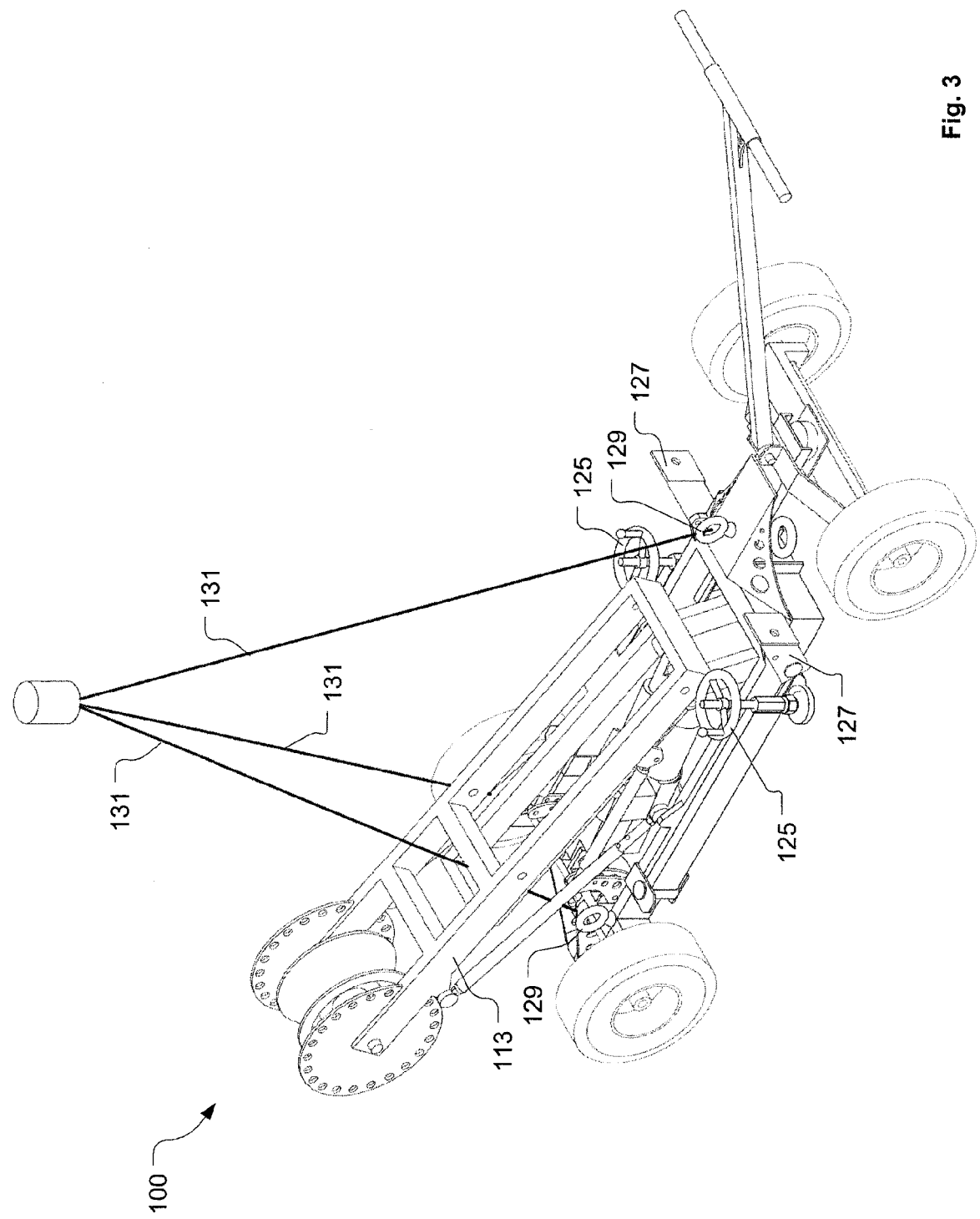
FIG. 3 is an illustration showing the wire pulling apparatus in a transport configuration, in accordance with one embodiment of the present invention.

FIG. 3 is an illustration showing the wire pulling apparatus 100 in a transport configuration, in accordance with one embodiment of the present invention. In the transport configuration, the frame 113 is in a lowered position, the pair of locking feet 127 are in an up position, and the outriggers 125 are in a retracted position. The apparatus 100 includes a number of eyebolts 129 to which a number of lifting cables 131 can be attached to enable lifting of the apparatus 100 by way of a crane or other similar device.

Figure 4:
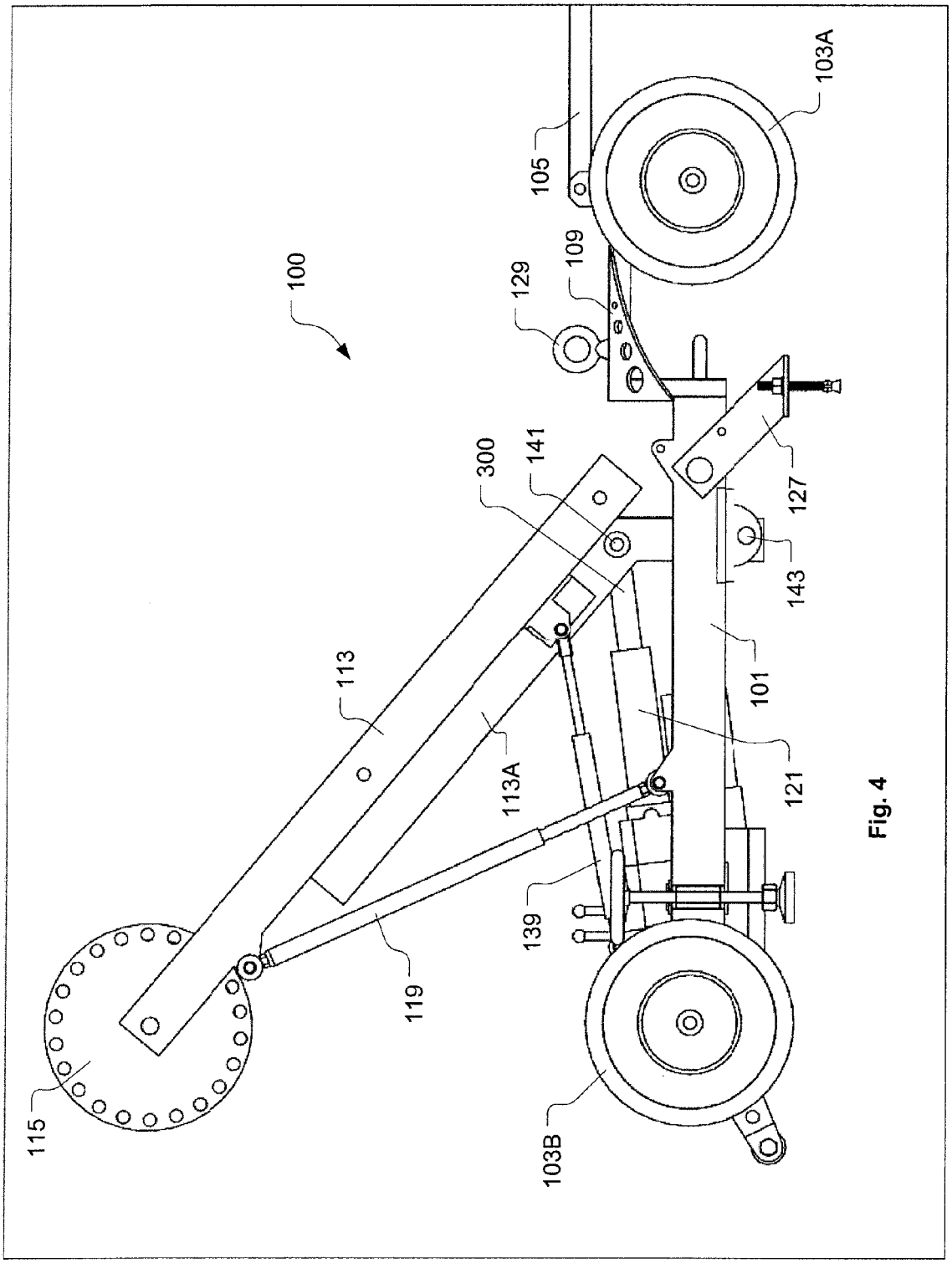
FIG. 4 is an illustration showing a side view of the wire pulling apparatus, in accordance with one embodiment of the present invention.

FIG. 4 is an illustration showing a side view of the wire pulling apparatus 100, in accordance with one embodiment of the present invention. A lifting member 300 of the jack 121 is shown to be pivotally connected to the frame 113 by way of a pin 141. More specifically, the lifting member 300 of the jack 121 is pivotally connected to a lower portion 113A of the frame 113 by the pin 141. The lower portion of the frame 113A is configured to angle downward at the location where the jack 121 is pivotally connected thereto. A lower end of the angled portion of the lower frame structure 113A is pivotally connected to the chassis 101 by way of a pin 143. Therefore, as the frame 113 (and 113A) is raised and lowered by the jack 121, the frame 113 (and 113A) will be made to pivot about the pin 143. In one embodiment, the angled portion of the lower frame structure 113A angles downward from the frame 113 at an angle of about 45°. However, it should be understood that in various embodiments, the angular relationship between the angled portion of the lower frame structure 113A and the frame 113 can differ from 45° so long as the angular relationship is compatible with the forces involved in operating the jack 121 to move the frame 113 and operating the winch 152 to pull the cable over the pulley 117 connected to the frame 113.

Figure 5:
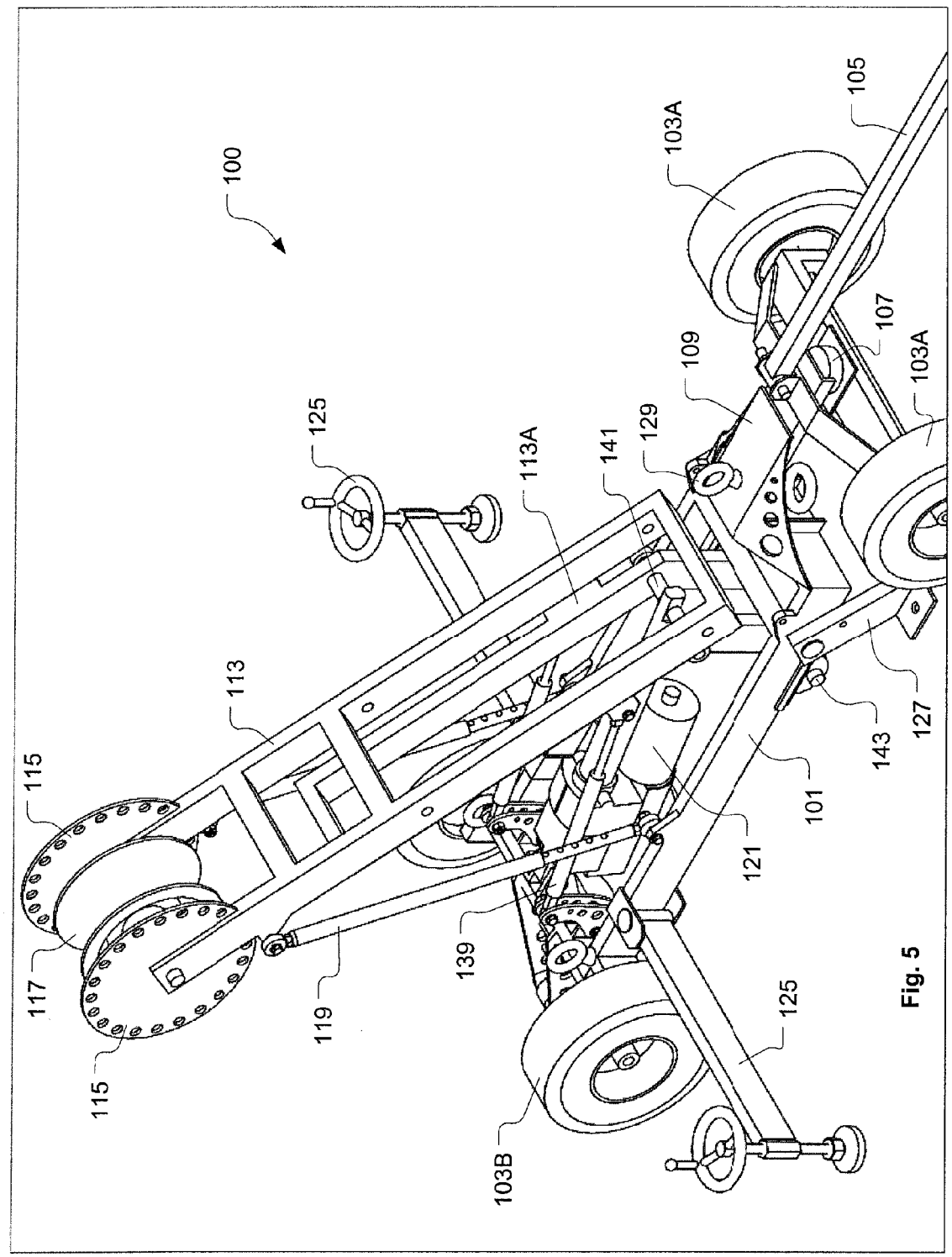
FIGS. 5, 6, and 7 show additional views of the apparatus as described above, in accordance with one embodiment of the present invention.
Figure 6:
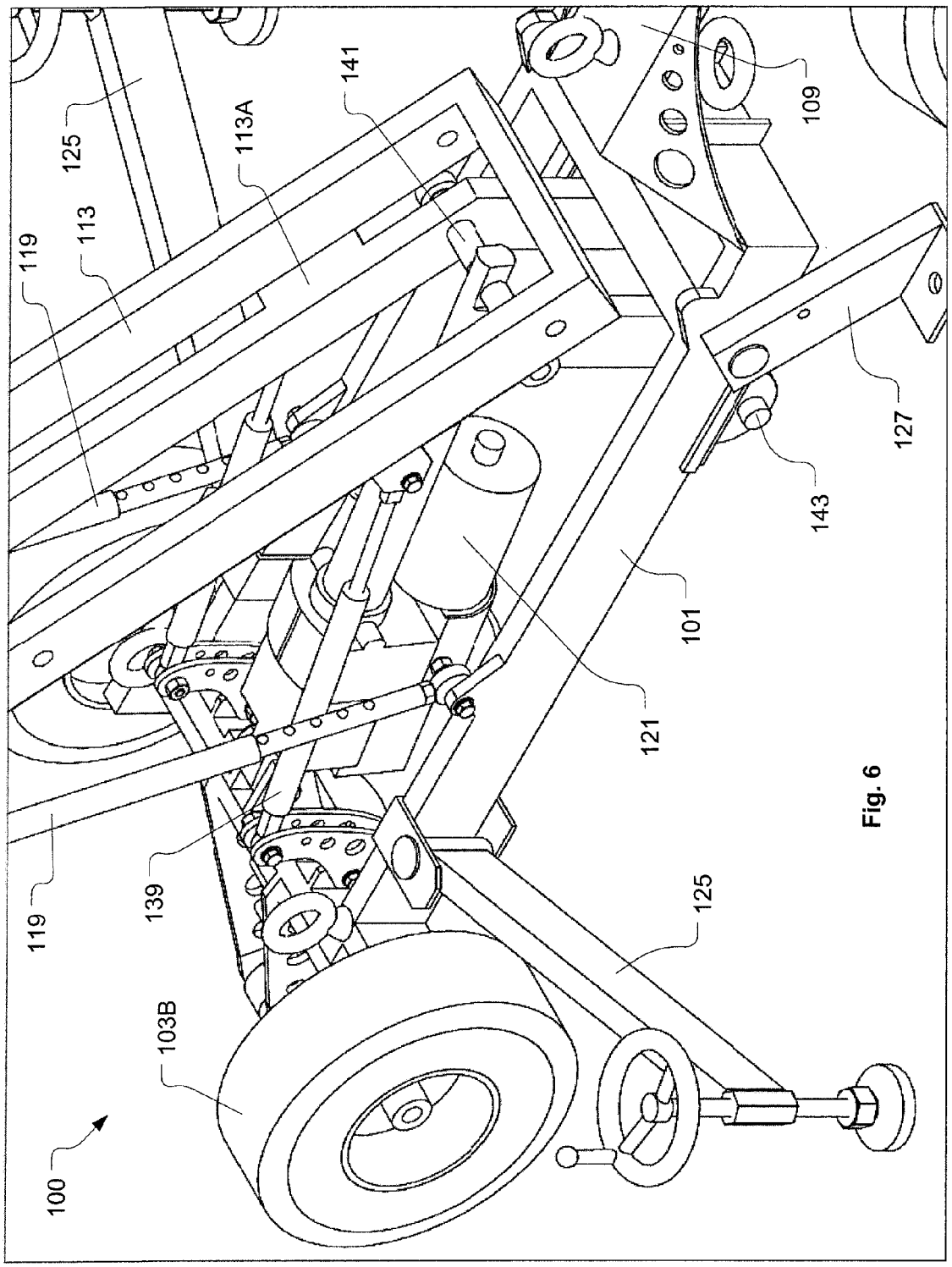
Figure 7:
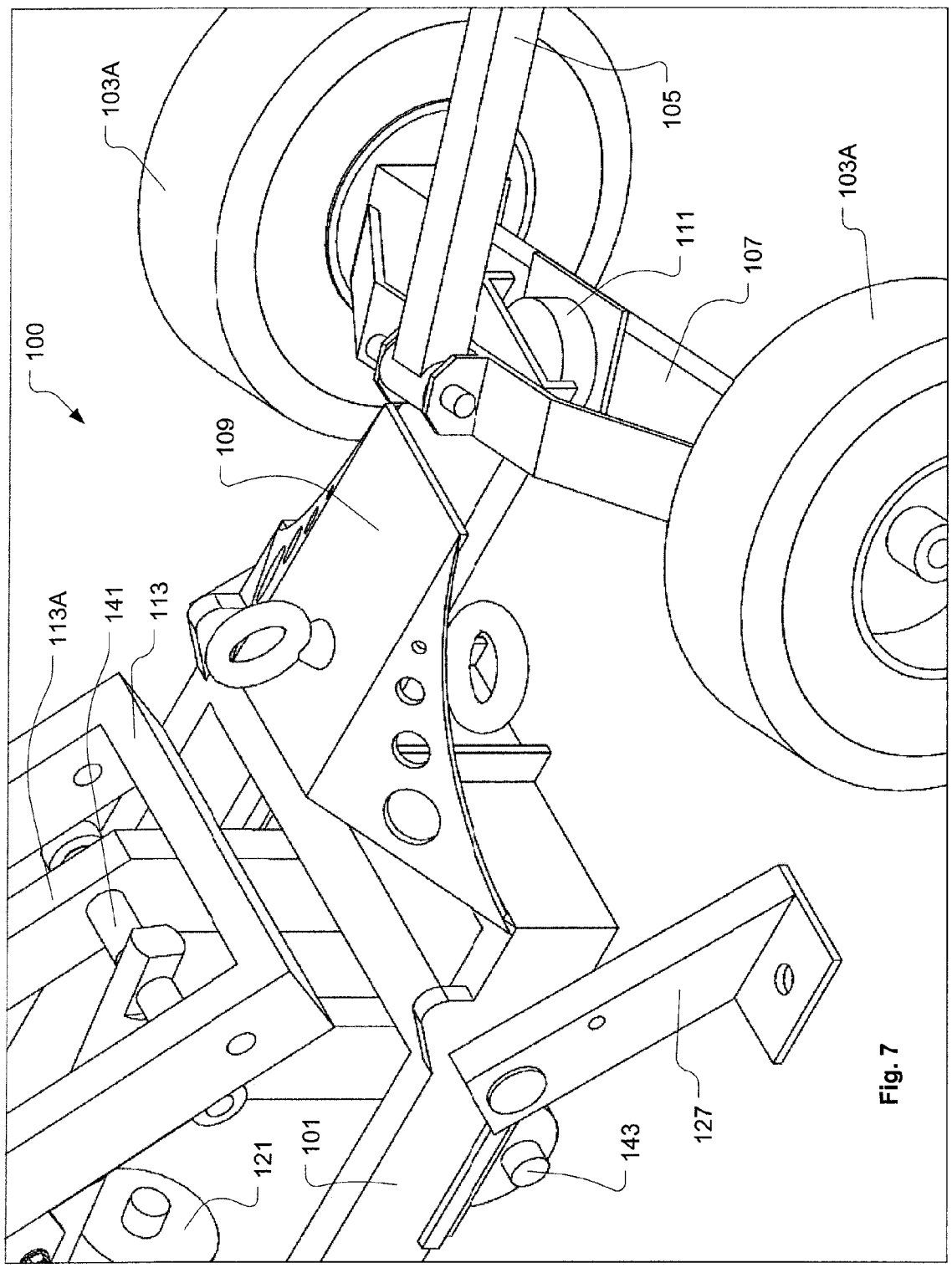

FIGS. 5, 6, and 7 show additional views of the apparatus 100 as described above, in accordance with one embodiment of the present invention. It should be appreciated that in practice, a number of additional pivoting arms can be connected in a sequential and multi-angled manner from the pivoting arm connection collar 115 to a conduit location through which the cable is to be pulled. Therefore, it should be appreciated that an enormous amount of weight can be present on the frame 113 by way of the pivoting arm connection collar 115. Consequently, the capability of the apparatus 100 to provide non-manual lifting of the frame 113 and pivoting arm connection collar 115, by way of the jack 121, provides a great benefit with regard to obtaining a proper position of the wire pulling apparatus 100 and associated pivoting arms. Additionally, the capability of the apparatus 100 to provide non-manual lifting of the frame 113 improves worker safety and efficiency by avoiding the need for personnel to physically interact with the apparatus 100 in an effort to adjust a height of the pivoting arm connection collar 115 and pulley 117, particularly when additional pivoting arms are connected to the pivoting arm connection collar 115.

Figure 8:
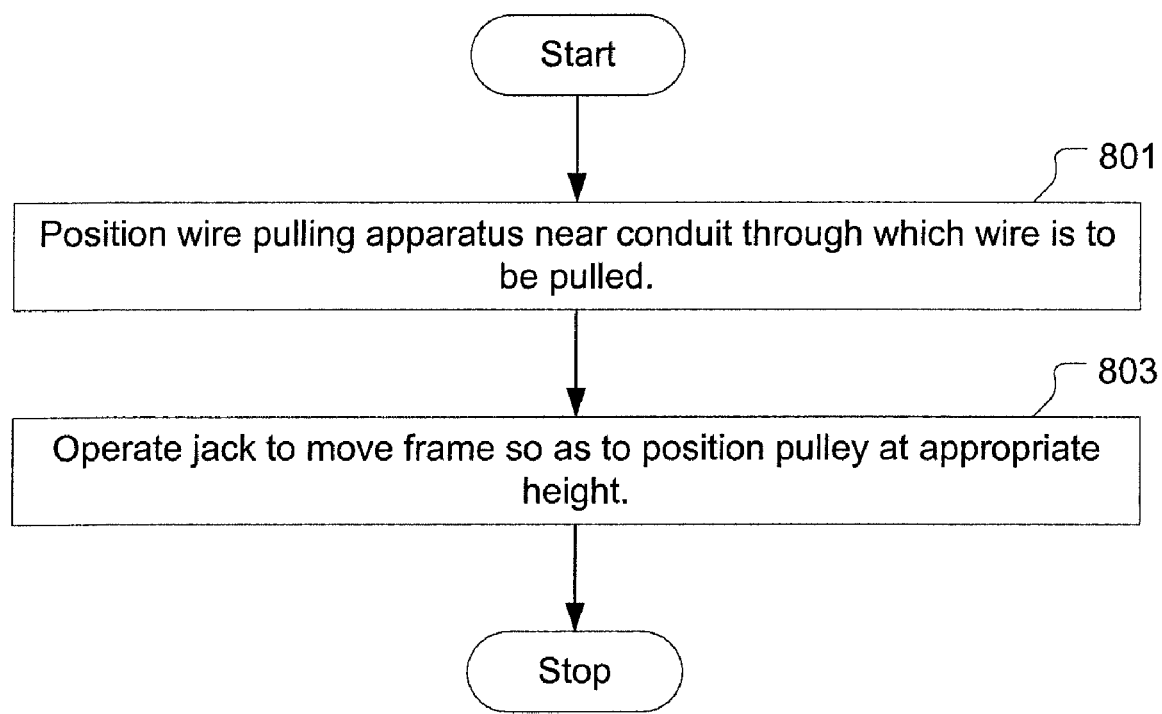
FIG. 8 is an illustration showing a method for operating a wire pulling apparatus, in accordance with one embodiment of the present invention.

FIG. 8 is an illustration showing a method for operating a wire pulling apparatus, in accordance with one embodiment of the present invention. The method includes an operation 801 for positioning a wire pulling apparatus near a conduit through which a wire is to be pulled. The wire pulling apparatus referenced in the method is the wire pulling apparatus 100 described above with regard to FIGS. 1A-7. The method includes another operation 803 for operating the jack 121 to move the frame 113 so as to position the pulley 117 at an appropriate height. It should be appreciated that operation of the jack 121 in operation 803 does not require direct physical interaction of personnel with the wire pulling apparatus 100. The method can also include an operation for securing the wire pulling apparatus 100 to be immobile once positioned near the conduit through which the wire is to be pulled. The method can further include an operation for deploying one or more outriggers 125 to stabilize the wire pulling apparatus 100. Additionally, the method can include operations for routing a cable over the pulley 117, connecting the cable to the winch 152, and operating the winch 152 to pull the cable and thereby pull the wire to which the cable is connected.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A wire pulling apparatus, comprising:
   a chassis defined to have a front end and a rear end;
   a frame defined to have a first end and a second end, the frame pivotally connected to the chassis at a location near the front end of the chassis and near the first end of the frame, wherein the frame includes an upper surface defined to support a winch;
   a jack disposed between the chassis and the frame to enable pivoting vertical movement of the frame relative to the chassis, wherein the pivoting vertical movement of the frame is caused by a member of the jack;
   a pulley supported by the frame at a location near the second end of the frame, whereby the pulley is disposed over the chassis and toward the rear end of the chassis;
   a winch disposed on the upper surface of the frame and defined to pull a cable over or under the pulley;
   a pair of front wheels connected to the front end of the chassis;
   a pair of rear wheels connected to the rear end of the chassis; and
   a handle connected to the chassis to enable movement of the chassis.

2. A wire pulling apparatus as recited in claim 1, wherein the frame is defined to include a downward angled portion near the first end of the frame, and wherein the frame is pivotally connected to the chassis through the downward angled portion of the frame.

3. A wire pulling apparatus as recited in claim 1, wherein a lifting member of the jack is pivotally connected to the frame, and a base of the jack is rigidly connected to the chassis.

4. A wire pulling apparatus as recited in claim 1, wherein the jack is defined as an electric jack remotely controllable by an electronic control device.

5. A wire pulling apparatus as recited in claim 1, further comprising:
   a stabilizer bar having a first end pivotally connected to the chassis and a second end pivotally connected to the frame.

6. A wire pulling apparatus as recited in claim 5, wherein the stabilizer bar is pivotally connected to the frame at a location near the pulley supported by the frame.

7. A wire pulling apparatus as recited in claim 1, further comprising:
   a pair of outriggers defined to be extended outward from the chassis, each of the pair of outriggers including a height adjustable foot defined to engage an underlying stable surface.

8. A wire pulling apparatus as recited in claim 1, wherein the handle is defined to have a length that provides sufficient leverage to enable manual movement of the wire pulling apparatus through rotation of the front and rear wheels.

9. A wire pulling apparatus as recited in claim 1, further comprising:

a front axle connected to the chassis by a pinned connection defined to provide horizontal rotation of the front axle relative to the chassis, wherein the pair of front wheels are connected to opposing ends of the front axle; and a rear axle connected to the chassis, wherein the pair of rear wheels are connected to opposing ends of the rear axle.

10. A wire pulling apparatus as recited in claim 9, wherein the handle is also connected to the front axle such that horizontal movement of the handle causes horizontal movement of the front axle.

11. A wire pulling apparatus as recited in claim 9, wherein the handle is connected to the front axle by a second pinned connection defined to provide vertical movement of the handle relative to the chassis.

12. A wire pulling apparatus as recited in claim 9, wherein the chassis includes a tongue portion formed at the front end of the chassis, wherein the tongue portion is defined to receive the pinned connection of the front axle to the chassis.

13. A system for pulling wire, comprising:

a wire pulling apparatus including a frame pivotally connected to a chassis at a location near a first end of the frame, a jack disposed with a lifting element between the chassis and the frame to enable vertical pivoting movement of the frame relative to the chassis, wherein a lifting member of the jack is pivotally connected to the frame, and a base of the jack is rigidly connected to the chassis, and a pulley connected to the frame at a location near a second end of the frame opposite the first end of the frame;

a winch disposed on the frame to enable pulling of wire over or under the pulley; and a control device defined as a mechanism to enable control of the jack so as to enable vertical positioning of the frame and pulley connected thereto.

14. A system for pulling wire as recited in claim 13, wherein the jack is defined as an electric jack, and the control device is defined to enable remote control of the electric jack.

15. A system for pulling wire as recited in claim 13, wherein the wire pulling apparatus includes a stabilizer bar having a first end pivotally connected to the chassis and a second end pivotally connected to the frame.

16. A system for pulling wire as recited in claim 13, wherein the wire pulling apparatus includes a pair of locking feet connected to the chassis to enable immobilization of the chassis.

* * * * *